Jan. 15, 1952     P. W. GARBO     2,582,246
PROCESS FOR CARRYING OUT ENDOTHERMIC
AND EXOTHERMIC REACTIONS
Original Filed Sept. 7, 1947
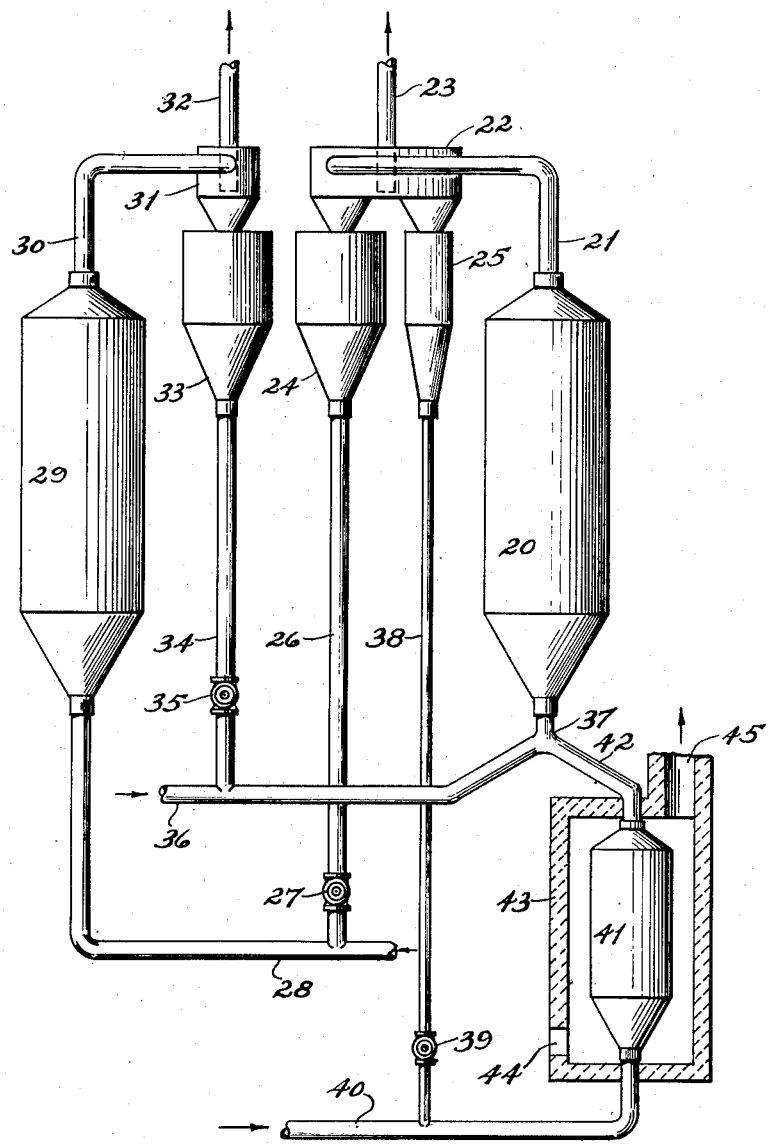
INVENTOR.
PAUL W. GARBO
BY
ATTORNEYS Patented Jan. 15, 1952

2,582,246

UNITED STATES PATENT OFFICE 2,582,246

PROCESS FOR CARRYING OUT ENDOTHERMIC AND EXOTHERMIC REACTIONS

Paul W. Garbo, Freeport, N. Y., assignor to Hydrocarbon Research, Inc., New York, N. Y., a corporation of New Jersey Original application September 7, 1947, Serial No. 552,977. Divided and this application January 2, 1948, Serial No. 40

3 Claims. (Cl. 196—52)

The invention pertains to reactions wherein gases or vapors are brought into intimate contact with solids to effect the desired conversions, and especially, reactions in which gases or vapors are contacted with solid catalysts, all said reactions being characterized in that they are markedly either endothermic or exothermic.

The technique of reacting solids and gases or vapors has reached a high state of development with the evolution of fluidization. According to this technique, reactant gases are passed through a bed of finely divided or powdered solids at such velocities that the solids become suspended in the gases but exhibit what has been termed "hindered settling." In practicing fluidization it is possible to adjust conditions so that a relatively dense mass of powder is maintained within the reaction zone and only a relatively small proportion of the powder is carried out of the reaction zone by the effluent gases. Another view of fluidization is that because of "hindered settling" the solid reactant has a longer residence time in the reactor than the gaseous reactant has. The technique of fluidization, which maintains a mass of powdered material in an agitated state resembling a boiling liquid and which permits the establishment of a pseudo-liquid level between the fluidized mass and the gas space above it, is the basis of the "fluid catalyst" process that has gained eminence in the manufacture of aviation gasoline.

While fluidization is one of the most adaptable procedures for bringing about reactions between solids and gases or vapors, it has a number of inherent disadvantages and limitations. For example, because of the random and turbulent motion of fluidized masses, the advantages of countercurrent flow of materials to effect the transfer of heat between them are lost. Other principal disadvantages are the relatively large reactors and accessory equipment and the relatively expensive separators, such as cyclones and Cottrell precipitators, which are necessitated when a highly endothermic or exothermic reaction is involved and powdered solid reactant is depended upon to convey heat to or from the reaction zone, respectively. This is particularly true where the solid reactant is a thermally deactivatable catalyst and the reaction is highly endothermic, e. g., the catalytic cracking of hydrocarbons. In other words, a powdered solid reactant in fluidized state is generally not an entirely satisfactory medium for conveying heat.

Several proposals have been set forth by various investigators of the fluidization technique for controlling the temperature of highly endothermic and exothermic reactions. For instance, in some exothermic processes it has been proposed to increase the rate of flow of the solid and gaseous reactants through the reaction zone and usually also to recycle some of the reaction products after passing them through a suitable cooler or waste heat boiler. This type of suggestion leads to considerable enlargement of the processing equipment and consequently increases costs. Special reactors have been designed so that heat exchange surfaces would be disposed within the fluidized reaction mass to maintain the desired temperature. However, as far as I am aware, these designs have proved impractical because the heat exchange surfaces either interfered with good fluidization or could not be sufficiently distributed throughout the fluidized mass to prevent uneven temperatures. Furthermore, such special reactors are relatively complex and costly.

The fluid catalyst process of the petroleum industry, which has found widespread application in the cracking of hydrocarbons presents particular difficulties with respect to the problem of supplying heat to the endothermic cracking reaction. As now practiced, a very large proportion of the heat required in the cracking zone is introduced by recycling hot regenerated catalyst in relatively large quantities. However, this procedure is subject to two major limitations: most catalysts are deactivated or injured at temperatures in excess of about 1100° F. and high ratios of catalyst to oil in the reaction zone lead to decreased yields of the more valuable cracked products. To circumvent the limitation of high catalyst-to-oil ratio it has been proposed to admix an inert powder with the powdered catalyst or to circulate part of the hot regenerated catalyst in indirect heat exchange relation with the fluidized catalyst of the reaction zone. Both schemes reduce the proportion of catalyst in contact with the hydrocarbons in the reaction zone but still are subject to the temperature limitation, say about 1100° F. In addition, these schemes require larger and more expensive equipment. To my knowledge, no one has advanced a practical procedure for overcoming the temperature limitation which is particularly onorous when it is remembered that hydrocarbons are cracked at temperatures approaching 1100° F. and heat must be supplied not only for the endothermic cracking reaction but also desirably for vaporizing the hydrocarbons which may be charged into the reactor as a liquid. These observations hold to more or less the same extent for several other hydrocarbon conversions, like dehydrogenation, hydroforming, isoforming, desulfurization and aromaticization, which may be carried out in accordance with the fluid catalyst process.

A primary object of my invention is to make the control of temperature within fluidized masses, undergoing endothermic or exothermic reactions, more flexible and independent.

Another important object is to facilitate greatly the flow of heat to highly endothermic reactions, or from highly exothermic reactions, conducted between reactants in a fluidized state.

Still another object is to simplify the equipment for conducting fluidized exothermic or endothermic reactions and to reduce its size.

A special object is to improve the fluid catalyst process for hydrocarbon conversions by supplying heat to the conversion zone by a novel procedure which avoids the present limitations of catalyst temperature and catalyst-to-oil ratio.

Other objects of my invention will be apparent in the description which follows.

According to my invention, exothermic or endothermic reactions between comminuted solids and gases or vapors, conducted in a fluidized state, are brought under more accurate temperature control by the use of an additional inert comminuted solid the principal function of which is to carry heat, and which is readily separable from the comminuted solids participating in the reaction. To make quick separation possible, the physical characteristics of the heat-carrying solid, so-called thermophore, differ so from those of the reaction solids that it will pass through the reaction zone admixed with the reaction solids but become segregated when the mixture is subjected to a physical influence to which the thermophore and reaction solids are differently responsive. Separation of thermophore and reaction solids may be accomplished through magnetism, electrostatic charges, density differences, etc. In the present invention the separation is accomplished by subjecting the mixture of thermophore and reaction solids to the action of a field of force in the form of a magnetic or electrostatic field. For the purpose of my invention, the term "reaction solids" includes solid catalysts. The desired reaction between powdered solid and gas is conducted in accordance with the fluidization technique, while superimposed upon this system is the cyclic flow of thermophore as fluidized powder. A powdered thermophore may be fluidized together with the reaction solids and the mixture on leaving the reaction zone may be passed through a magnetic, electrostatic or other suitable separator to segregate the thermophore and reaction solids. The powdered thermophore is cooled or heated for an exothermic or endothermic reaction, respectively, and recirculated through the fluid reaction zone. This application is a division of my co-pending application, Serial Number 552,977, filed September 7, 1944, and now abandoned.

For a clearer and fuller understanding of my invention, reference is made to the drawing accompanying this specification, in which the figure is a diagrammatic representation of a fluid reaction system embodying the use of a powdered thermophore which is readily separable from the powdered reaction solids.

As a specific application of my invention to an endothermic process may be cited the carbonization and gasification of coal. Pulverized coal, e. g., one passing through a 60-mesh screen and having about a 60% fraction retained on a 140-mesh screen and about a 25% fraction passing through a 325-mesh screen, is carried in suspension by a stream of coal gas into the reactor wherein fluidization occurs.

Referring to the figure, my invention which involves the use of a fluidizable and readily separable thermophore is explained in terms of a fluid catalyst cracking plant. In reactor 20 is a powdered mixture of catalyst and readily separable thermophore fluidized by the passage of hydrocarbon vapors up through the reactor. The gas velocity is such that the mixed solids are continuously withdrawn from reactor 20 by entrainment in the effluent gases. The product gases and suspended solids flow through pipe 21 into separator 22 wherein, because of different physical susceptibilities, the thermophore and catalyst powders are separated from each other and from the product gases which flow through pipe 23 to conventional fractionation and recovery equipment. The separated catalyst and thermophore powders drop into hoppers 24 and 25, respectively. The spent catalyst travels down standpipe 26 and through valve 27 into pipe 28 through which air is flowing. The spent catalyst suspended in air enters regenerator 29 and therein the catalyst, in a fluidized condition, is revivified by combustion of its carbonaceous coating. The process variables are adjusted so that the temperature in the regenerator does not reach the point where thermal deactivation or injury of the catalyst occurs. Flue gases carrying regenerated catalyst powder flow through pipe 30 into a cyclone separator 31. The flue gases are vented through pipe 32 while the catalyst drops into hopper 33. The regenerated catalyst moves down standpipe 34 and through valve 35 into pipe 36. Hydrocarbon feed passing through pipe 36 conveys the catalyst powder in suspension through inlet pipe 37 of reactor 20. The thermophore powder in hopper 25 runs down standpipe 38 and through valve 39 into pipe 40. A conveying gas injected through pipe 40 takes the thermophore into heater vessel 41 wherein in a fluidized state the thermophore is raised to a desired temperature. The heated thermophore and conveying gas travel through pipes 42 and 37 and become thoroughly commingled in reactor 20 with the incoming steam of regenerated catalyst and hydrocarbons. The stream of hot thermophore provides the supplementary heat required to maintain the reaction mass at the highest possible temperature below the point where deactivation of the catalyst is noted. Because of the high turbulence in a fluidized mass, the thermophore particles are quickly dispersed throughout the mass of powdered catalyst with the result that heat is conveyed to every section of the reaction zone and there is very rapid equalization of temperature. A furnace setting 43 (shown in vertical section) surrounds heater vessel 41. Opening 44 is for the introduction of a combustible mixture like fuel oil and air, and stack 45 provides a vent for the flue gases.

Typical operating conditions for this system would include the use of synthetic silica-alumina type catalyst which shows little or no deactivation up to a temperature of about 1300° F., and as thermophore, powdered Carborundum (silicon carbide) which is separable from the catalyst electrostatically. The regeneration of spent catalyst is so conducted that the temperature does not exceed about 1250° F., while the Carborundum suspended in noncondensable gases like hydrogen, methane and ethylene recovered from the product gases issuing from the reactor, is heated to a temperature of about 1800° F. Based on the hydrocarbon feed, the catalyst:oil ratio is 12:1. The amount of recycle gas is the minimum which will satisfactorily convey the thermophore powder through the heater and into the reactor. The hydrocarbon feed is at a temperature of about 840° F. The thermophore is fed at a rate such that the resultant temperature in the reactor is desirably high but below the catalyst deactivation point of about 1300° F. A very favorable product distribution is obtained under these conditions.

Another example of the operation of the embodiment of my invention which is diagrammatically represented in the figure is the conversion of hydrocarbons in the presence of a fluid catalyst which has a high magnetic susceptibility and of a fluid nonmagnetic thermophore. Those skilled in the art know, e. g., in accordance with the teachings of Roesch et al. in U. S. Patent 2,348,418, that nonmagnetic catalysts like bentonite clays may be rendered responsive to magnetic fields if they are treated with a relatively small amount of iron or nickel salt. In the case of synthetic catalysts, the catalytic material may be deposited on particles of iron so that each iron particle is enveloped by a film of the catalytic material but responds as an iron particle to a magnetic field. Alternatively, the fluid catalyst may be nonmagnetic and the fluid thermophore may be selected from materials that either are naturally magnetic or are rendered magnetic by incorporating magnetic substances in their compositions. It is clear that, where I employ a fluid magnetic catalyst or thermophore, I effect separation of such catalyst or thermophore from nonmagnetic thermophore or catalyst, respectively, by passing the mixture through a magnetic field. While it may be desirable to design a special separator embodying a magnetic field, there are several magnetic separators which are marketed and are adaptable to the service contemplated by my invention. Those skilled in the art appreciate that where the magnetic powder leaves the reactor at or above the temperature at which the magnetic material in the powder loses a substantial amount of its magnetic susceptibility, the powder is first cooled to a point where it is sufficiently responsive to a magnetic field to achieve the desired separation. Similarly, where the magnetic powder loses its magnetic susceptibility because of chemical changes, e. g., oxidation, resulting in the reactor, the mixture of magnetic and nonmagnetic powders issuing from the reactor is chemically treated to restore the magnetic susceptibility of the magnetic powder prior to the passage of the mixture through the magnetic separator. The restoration of the magnetic susceptibility of a material is also disclosed in U. S. Patent 2,348,418.

In the fluid catalyst cracking of hydrocarbons conducted in the conventional way, the temperature in the reaction zone is controlled by three prime factors, viz., (1) the temperature of the hot regenerated catalyst, (2) the temperature of the hydrocarbons fed to the reactor and (3) the catalyst:oil ratio. The temperature of regeneration of the catalyst must be kept below the point at which deactivation or injury of the catalyst begins. It is not commercially feasible to heat the hydrocarbon feed to temperatures in excess of about 900° F. because of coking and other operational limitations. Because the regenerated catalyst can be heated to higher temperatures than the hydrocarbon feed, the introduction of greater quantities of heat into the reaction zone is frequently attempted by increasing the catalyst:oil ratio. However, there is a definite limitation even in this factor since at high ratios, the conversion reaction is shifted to the production of carbon and other undesirable by-products with consequent decrease in the yield of valuable hydrocarbons. For any given operation, the maximum allowable ratio varies with the catalyst, the hydrocarbon feed and the desired products. Accordingly, it is clear that from the commercial point of view, an impasse is often reached in the attainment of higher reaction temperatures which are desired because of improved product quality and quantity.

By the use of a readily separable thermophore, which is heated to a temperature higher than is permissible in the regenerator, not only may a higher conversion temperature be attained but also the entire plant may be made smaller because of a marked reduction in the volume of solids that otherwise would have to be circulated. In effect, these two important advantages may be achieved by my invention by circumventing two of the three processing limitations of the fluid catalyst cracking process, viz., catalyst:oil ratio and catalyst regeneration temperature.

It is understood that the foregoing examples are illustrative of my invention but in no sense represent the limits of its applications. Several modifications will be apparent to those skilled in the art. For example, the furnace setting 43 may be omitted and a combustible mixture, like oxygen and methane, may be introduced into heater 41 so that the thermophore in a fluid condition is raised to the desired temperature by internal combustion. The flue gases would act as the suspending and conveying medium for the transfer of hot thermophore from heater 41 to reactor 20. For an exothermic reaction, heater 41 would be replaced by a cooler.

The thermophore is preferably a material which is high in both specific gravity and specific heat. Good thermal conductivity is another factor to be considered in the selection of a thermophore. Prominent among the materials that may be employed as thermophores are silicon carbide, iron, aluminum, fused alumina, periclase, glass, sand, magnetite, graphite, and halides of alkali metals. In selecting a thermophore, the reaction and the attendant conditions to which the thermophore will be exposed must be considered. In some exothermic systems, it may be advisable to cool the thermophore by quenching it with liquid as it leaves the reactor. Contrarily, the thermophore may be heated by passing it through a zone of burning gas prior to its entry into an endothermic reactor. Obviously, all thermophores cannot be exposed to such treatments as direct quenching or direct firing.

Those skilled in the art will visualize many commutations and permutations of the elements of my invention. Such modifications conforming to the spirit of the invention are to be considered within the scope of the claims.

I claim:

1. In an endothermic process for the conversion of hydrocarbons in the presence of a dense phase fluidized bed of catalyst, said catalyst being characterized by loss of activity upon heating to an elevated deactivation temperature, the improvement in supplying heat to the conversion zone which comprises continuously introducing to the conversion zone said comminuted catalyst and a particulate inert solid thermophore which is high in specific heat, specific gravity, and thermal conductivity and which has a response to a non-gravitational field of force different from that of said catalyst, fluidizing a mixture of said catalyst and said thermophore together in the reaction zone as a dense phase fluidized bed by passing a hydrocarbon stream in gaseous form through said mixture into contact with the catalyst to effect conversion of said hydrocarbons, continuously withdrawing a mixture of said catalyst and said thermophore from said conversion zone, separating said thermophore from said catalyst in said mixture by subjecting said mixture to the action of a field of force other than gravitation to which the solids have different response, regenerating said separated catalyst at an elevated temperature below the deactivation temperature of said catalyst, heating said separated thermophore to a temperature above said deactivation temperature of said catalyst by combustion of an extraneous fuel, and reintroducing the thus heated thermophore together with the regenerated catalyst into the conversion zone.

2. The process of claim 1 wherein the separation of said thermophore from said catalyst in said withdrawn mixture is effected under the influence of an electrostatic field.

3. The process of claim 1 wherein the separation of said thermophore from said catalyst in said withdrawn mixture is effected under the influence of a magnetic field.

PAUL W. GARBO.

REFERENCES CITED

The following references are of record in the file of this patent:

UNITED STATES PATENTS

| Number | Name | Date |
|---|---|---|
| 2,175,484 | Rees et al. | Oct. 10, 1939 |
| 2,348,418 | Roesch et al. | May 9, 1944 |
| 2,353,119 | Workman | July 4, 1944 |
| 2,376,564 | Upham et al. | May 22, 1945 |
| 2,393,636 | Johnson | Jan. 29, 1946 |
| 2,400,176 | Thiele | May 14, 1946 |
| 2,437,352 | Fragen | Mar. 9, 1948 |
| 2,441,170 | Rose et al. | May 11, 1948 |